United States Patent
Inamdar et al.

(10) Patent No.: US 10,070,289 B1
(45) Date of Patent: Sep. 4, 2018

(54) CLIENT ASSOCIATION FOR PROVISIONING DEVICES IN A COMMUNICATION NETWORK

(71) Applicant: Marvell International Ltd., Hamilton (BM)

(72) Inventors: Amey Dattatray Inamdar, Pashan (IN); Kedar Sovani, Pashan (IN); Nikita Nerkar, Maharashtra (IN)

(73) Assignee: MARVELL INTERNATIONAL LTD., Hamilton (BM)

( * ) Notice: Subject to any disclaimer, the term of this patent is extended or adjusted under 35 U.S.C. 154(b) by 219 days.

(21) Appl. No.: 15/097,080

(22) Filed: Apr. 12, 2016

Related U.S. Application Data (60) Provisional application No. 62/147,145, filed on Apr. 14, 2015.

(51) Int. Cl.
- *H04W 4/50* (2018.01)
- *H04W 4/00* (2018.01)
- *H04W 76/02* (2009.01)
- *H04W 76/10* (2018.01)

(52) U.S. Cl.
CPC ............ *H04W 4/50* (2018.02); *H04W 4/001* (2013.01); *H04W 76/02* (2013.01); *H04W 76/10* (2018.02)

(58) Field of Classification Search
CPC .............................. H04W 4/001; H04W 76/02
See application file for complete search history.

(56) References Cited

U.S. PATENT DOCUMENTS

| | | | | |
|---|---|---|---|---|
| 6,345,043 B1* | 2/2002 | Hsu | ...... | H04W 76/02 370/324 |
| 8,570,898 B1* | 10/2013 | Kopikare | ...... | H04W 84/20 370/254 |
| 2010/0272083 A1* | 10/2010 | Itoh | ...... | H04W 84/20 370/338 |
| 2011/0222516 A1* | 9/2011 | Kurose | ...... | H04M 1/7253 370/338 |
| 2013/0019298 A1* | 1/2013 | Jover Segura | ...... | H04L 63/101 726/7 |

(Continued)

OTHER PUBLICATIONS

Gil Reiter, "A primer to Wi-Fi® provisioning for IoT applications", White Paper, Texas Instruments Incorporated, Dallas, TX, 2014, 9 pages.

*Primary Examiner* — Peter Chau (57) ABSTRACT

The present disclosure includes systems and techniques relating to client association for provisioning devices in a communication network. In some implementations, an association request to associate with a provisioning device is received by a device operating in a sniffer provisioning mode. The device sniffs traffic over a wireless communication channel by listening to the wireless communication channel and capturing traffic on the wireless communication channel in the sniffer provisioning mode. In response to receiving the association request, the device switches to an access point (AP) provisioning mode. An association response to the association request is transmitted by the device over the wireless communication channel. Connection information for establishing a connection with an external AP is received by the device. A connection with the external AP is established by the device based on the connection information.

20 Claims, 4 Drawing Sheets

(56) References Cited

U.S. PATENT DOCUMENTS

2014/0362841 A1\* 12/2014 Shibata ................ H04W 48/18
370/338
2015/0019717 A1\* 1/2015 Li ...................... H04L 67/1085
709/224

\* cited by examiner

CLIENT ASSOCIATION FOR PROVISIONING DEVICES IN A COMMUNICATION NETWORK

CROSS REFERENCE TO RELATED APPLICATIONS

This application claims the benefit of the priority of U.S. Provisional Application Ser. No. 62/147,145, filed Apr. 14, 2015 and entitled "Method for client association in simultaneous AP-sniffer mode," which is hereby incorporated by reference in its entirety.

BACKGROUND

The present disclosure describes systems and techniques relating to client association for provisioning devices in a communication network, such as an Internet-of-Things (IoT) network.

The IoT, or the Internet of Everything, is a network of physical objects or "things" that can collect and exchange data. The physical objects or "things" can include a wide variety of devices such as wearables, implants, chips, connected automobiles, smart home appliances (e.g., smart thermostats, washer/dryers, and refrigerators), and field operation devices. With embedded electronics, software, sensors, and existing network infrastructure, these devices can collect and transfer data among each other and access internal networks (e.g., home networks) or external networks (e.g., the Internet). The IoT can allow remote monitoring and control of the devices.

SUMMARY

The present disclosure includes systems and techniques relating to client association for provisioning devices in a communication network. According to an aspect of the described systems and techniques, a device includes processor electronics configured to: receive an association request to associate with a provisioning device, the device operating in a sniffer provisioning mode, the device sniffing traffic over a wireless communication channel by listening to the wireless communication channel and capturing traffic on the wireless communication channel in the sniffer provisioning mode; in response to receiving the association request, switch to an access point (AP) provisioning mode; transmit an association response to the association request over the wireless communication channel; receive connection information for establishing a connection with an external AP; and establish a connection with the external AP based on the connection information.

Implementations of this aspect can include one or more of the following features. In some implementations, the association request is received over a wireless local area network (WLAN) channel, and the association response to the association request is transmitted over the WLAN channel. In some implementations, the association request comprises an authentication request or a directed probe request. In some implementations, the processor electronics are further configured to, prior to receiving the association request: receive a probe request; and transmit a probe response to the probe request. In some implementations, wherein the probe request is received over a wireless local area network (WLAN) channel and the probe response is transmitted on the WLAN channel. In some implementations, wherein the sniffer provisioning mode is a part of a simultaneous AP-sniffer provisioning mode. In some implementations, the processor electronics is configured to, in response to establishing the connection with the external AP, switch to a simultaneous AP-sniffer provisioning mode. In some implementations, the processor electronics is configured to receive retransmission of the association request during the switching to the AP provisioning mode.

According to another aspect of the described systems and techniques, a method includes receiving, by a device operating in a sniffer provisioning mode, an association request to associate with a provisioning device, the device sniffing traffic over a wireless communication channel by listening to the wireless communication channel and capturing traffic on the wireless communication channel in the sniffer provisioning mode; in response to receiving the association request, switching, by the device, to an access point (AP) provisioning mode; transmitting, by the device, an association response to the association request over the wireless communication channel; receiving, by the device, connection information for establishing a connection with an external AP; and establishing, by the device, a connection with the external AP based on the connection information.

Implementations of this aspect can include one or more of the following features. In some implementations, the association request is received over a wireless local area network (WLAN) channel, and the association response to the association request is transmitted over the WLAN channel. In some implementations, the association request comprises an authentication request or a directed probe request. In some implementations, the method further includes, prior to receiving the association request: receiving, by the device, a probe request; and transmitting, by the device, a probe response to the probe request. In some implementations, wherein the probe request is received over a wireless local area network (WLAN) channel and the probe response is transmitted on the WLAN channel. In some implementations, wherein the sniffer provisioning mode is a part of a simultaneous AP-sniffer provisioning mode. In some implementations, the method further includes, in response to establishing the connection with the external AP, switching, by the device, to a simultaneous AP-sniffer provisioning mode. In some implementations, the method further includes receiving retransmission of the association request during the switching to the AP provisioning mode.

According to another aspect of the described systems and techniques, a non-transitory computer-readable medium embodies a program operable to cause a device to perform operations includes receiving, by the device operating in a sniffer provisioning mode, an association request to associate with a provisioning device, the device sniffing traffic over a wireless communication channel by listening to the wireless communication channel and capturing traffic on the wireless communication channel in the sniffer provisioning mode; in response to receiving the association request, switching, by the device, to an access point (AP) provisioning mode; transmitting, by the device, an association response to the association request over the wireless communication channel; receiving, by the device, connection information for establishing a connection with an external AP; and establishing, by the device, a connection with the external AP based on the connection information.

Implementations of this aspect can include one or more of the following features. In some implementations, the association request is received over a wireless local area network (WLAN) channel, and the association response to the association request is transmitted over the WLAN channel. In some implementations, the association request comprises an authentication request or a direct probe request. In some implementations, the operations further include, prior to receiving the association request: receiving, by the device, a probe request; and transmitting, by the device, a probe response to the probe request. In some implementations, wherein the probe request is received over a wireless local area network (WLAN) channel and the probe response is transmitted on the WLAN channel. In some implementations, wherein the sniffer provisioning mode is a part of a simultaneous AP-sniffer provisioning mode. In some implementations, the operations further include, in response to establishing the connection with the external AP, switching, by the device, to a simultaneous AP-sniffer provisioning mode. In some implementations, the operations further include receiving retransmission of the association request during the switching to the AP provisioning mode.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, or a medium access unit), a mobile data processing apparatus (e.g., a wireless client, a cellular telephone, a personal digital assistant (PDA), a mobile computer, or a digital camera), a general purpose data processing apparatus (e.g., a minicomputer, a server, a mainframe, or a supercomputer), or combinations of these.

The disclosed technologies can result in one or more of the following potential advantages. The described systems and techniques can provide more reliable client association for performing device provisioning in a communication system. The described systems and techniques can provide simultaneous sniffer based provisioning and access point (AP) based provisioning scheme (also referred to as a simultaneous AP-sniffer provisioning mode). Such a simultaneous AP-sniffer mode can provide ease-of-use (e.g., by not requiring users to switch between the networks) due to the sniffer provisioning mode while guaranteeing reliability by using AP based provisioning as a backup method.

Details of one or more implementations are set forth in the accompanying drawings and the descriptions below. Other features and advantages may be apparent from the description and drawings, and from the claims.

DETAILED DESCRIPTION

The systems and techniques described herein can be implemented as one or more microcontrollers (e.g., in the form of integrated circuit (IC) chips, modules, processors, or other devices) in a communication device (e.g., a wireless communication device, a wireline communication device, an electronic data storage device, a channel medium access access/control device, or an Internet-of-Things (IoT) class of devices). For example, the systems and techniques disclosed can be implemented in a wireless local area network (WLAN) transceiver device (e.g., a WLAN chipset), a cellular device (e.g., a smart phone), an appliance (e.g., a smart refrigerator), or any other devices suitable for use in a communication network.

Provisioning refers to a first-time process in which a device is provided access information to join, connect, or otherwise be associated with a communication network. For example, provisioning can allow a WLAN (e.g., WiFi) enabled device obtaining home WiFi network credentials to join the home WiFi network (i.e., a WiFi network at home). After provisioning, the device can connect to a home WiFi network and can access other services like the Internet through an access point (AP) of the home WiFi network.

In some implementations, a microcontroller can be configured to serve as a connectivity platform for provisioning various devices. For example, the microcontroller can be embedded, integrated, or attached to a device to be provisioned (e.g., an IoT class of device). The microcontroller can work together with a provisioning client (also referred to as a client device or remote) to provision the device.

For example, a provisioning client can be a computer, a smart phone or a tablet running a provisioning application. The provisioning client may have already connected to an AP of the communication network (e.g., a home WiFi network) so the provisioning device is a client to the AP of the communication network. The provisioning client can have a user interface (e.g., a display, a screen, or a touch-screen) that facilitates a user's interaction or use of the provisioning application on the client device for provisioning the device that is currently in an un-configured or un-provisioned state (e.g., the device which the microcontroller is embedded in or attached to).

The microcontroller and the provisioning client device can be connected by a client association process. Client association refers to a first-time process of establishing a connection between the microcontroller and the provisioning client device. In some implementations, client association only takes place in the AP provisioning mode and is a Wi-Fi association from a provisioning client to the microcontroller. In some implementations, client association is the process of establishing communication channel between the provisioning client and the microcontroller for provisioning, whereas the provisioning is a configuration process of the microcontroller.

In some implementations, once a connection between the provisioning client and the microcontroller is established, the provisioning client can send network credentials and/or other configuration information using the established connection. The microcontroller can receive the network credentials and use them for provisioning devices to join the communication network. In some instances, for example, in sniffer based provisioning, where network credentials and other configuration information are sent using network traffic, connection between microcontroller and provisioning client is not required.

The microcontroller can provide multiple provisioning modes such as an AP based provisioning mode, a sniffer based provisioning mode, a Wi-Fi Protected Setup (WPS) based provisioning mode, a Wireless Accessory Configuration (WAC) provisioning mode, and other types of provisioning modes.

In a WPS based provisioning mode (also referred to as a WPS provisioning mode or a WPS mode), a device can be provisioned using the WPS protocol, for example, by pressing a push-button on the device and the AP of the communication network. However, not all APs support WPS protocols.

In an AP based provisioning mode (also referred to as a micro AP based provisioning mode, an AP provisioning mode or an AP mode), the microcontroller can act as a micro AP. The micro AP creates a network of its own (as opposed to the communication network that the device is trying to join), allowing a provisioning client to connect to the micro AP and providing network credentials and/or other configurations to the microcontroller in the network created by the micro AP. In some implementations, the AP-based provisioning mode provides a number of RESTful web APIs (i.e., web service application programming interfaces (APIs) that adhere to the representational state transfer (REST) architectural constraints) that can be used by the provisioning application running on the provisioning client to communicate with and configure a device under configuration (DUC). The WAC provisioning mode is a variant of AP based provisioning mode.

In a sniffer based provisioning mode (also referred to as a sniffer provisioning mode or a sniffer mode), the microcontroller acts as a sniffer that detects traffic on wireless channels in a passive manner. The microcontroller can detect network traffic transmitted by the provisioning client and extract network credentials or other configuration information to provision the microcontroller device.

In some implementations, the sniffer based provisioning is simple and easy from the end user perspective, but it does not perform active discovery of devices to be provisioned. In some instances, the sniffer based provisioning may fail under certain cases (e.g., when the frequency band and data rate supported by the unprovisioned device is not supported by the microcontroller).

The AP based provisioning mode is more reliable. If the microcontroller acts as a micro AP that can be discovered, the provisioning client can discover the devices to be provisioned beforehand and can provide a better user experience.

In some implementations, a co-existence of the sniffer and AP based provisioning can be of great value to make an overall provisioning experience robust. For example, the AP based provisioning mode can be provided as a fallback option for sniffer based provisioning mode by supporting AP based provisioning mode simultaneously with the sniffer based provisioning mode (also referred to as a simultaneous AP-sniffer mode) which can ensure the reliability of the process. For example, in the simultaneous AP-sniffer provisioning mode, the microcontroller keeps dwelling on multiple channels, periodically sniffing the traffic and also sending periodic beacons to make the micro AP visible.

In some instances, unlike standard APs, the micro AP is only visible to the provisioning clients in the simultaneous AP-sniffer provisioning mode, and an attempt of client association may fail as beacons are sent from different channels. For example, in simultaneous AP-sniffer provisioning mode, the device keeps hopping across various channels to sniff packets on all of them. Based on the amount of time spent on each channel, it may so happen that the device misses a probe request that was sent out by the client, which renders the device invisible at times to the client. Techniques for associating the provisioning client with the microcontroller in a reliable manner are described for facilitating provisioning devices in the communication network.

Figure 1:
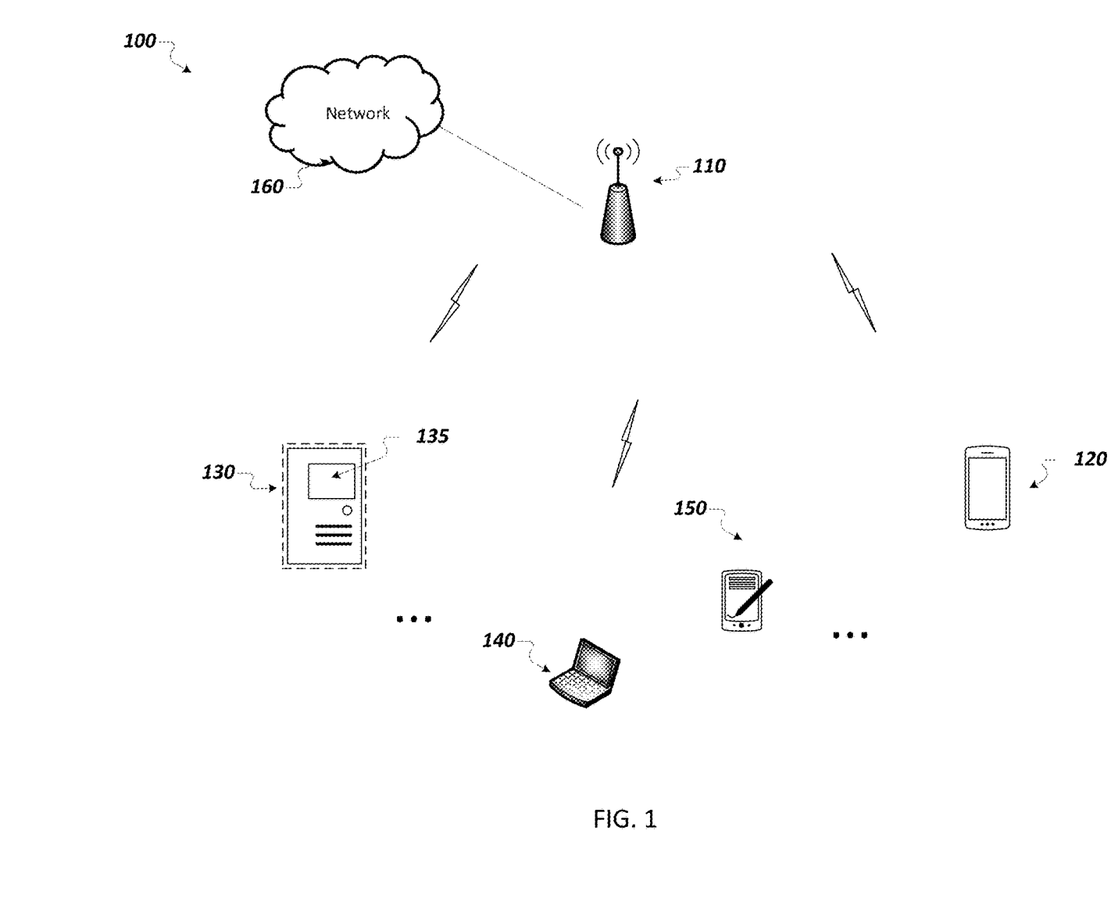
FIG. 1 is a block diagram showing an example of a communication system.

FIG. 1 is a block diagram showing an example communication system 100. The example communication system 100 can represent a WLAN system, a cellular system a near-field communication system, a machine-to-machine communication system, or other type of communication system. As an example, the system 100 can include an IoT system such as a home WiFi system.

The example communication system 100 can include multiple devices 110, 120, 130, 140 and 150. The devices 110, 120, 130, 140 and 150 can represent one or more of a wireless communication device, an IoT class of device, or other communication device. Various examples of the wireless communication devices include mobile phones, smart phones, wireless routers, wireless hubs, etc. In some cases, wireless communication electronics are integrated with data processing equipment such as laptops, personal digital assistants, and computers. Various example of IoT class of devices include wearables, implants, chips, connected automobiles, smart home appliances, etc.

In some implementations, a wireless communication device 110 can represent an access point (AP) of the home WiFi network that provides connectivity with a network 160, such as the Internet, to other communication devices 120, 130, 140, and 150. For instance, the wireless communication device 110 can allow the communication devices 120, 130, 140, and 150 to access the Internet and facilitate the communications between the communication devices 120, 130, 140, and 150. The wireless communication device 110 can allocate radio frequency resources to the communication devices 120, 130, 140, and 150 for communications over one or more WLAN channels.

The communication device 120 can represent a provisioning client that runs a provisioning application. The provisioning client 120 can run a proprietary protocol. For example, in some implementations, the provisioning application includes the combination of the sniffer mode provisioning and AP mode provisioning application. The proprietary protocol can be executed to sniff packets on the network and switch to sniffer based provisioning or AP based provisioning mode based on type of the packets received. The provisioning client 120 is connected to and served by the AP 110 and is thus a client with respect to the AP 110.

The communication device 130 can represent a device under configuration (DUC) that needs to be provisioned. The communication device 130 includes a microcontroller 135 that serves as a connectivity platform for provisioning the communication device 130. The microcontroller 135 can operate, for example, in an AP provisioning mode, a sniffer provisioning mode, or a simultaneous AP-sniffer provisioning mode (also referred to as a smart configuration mode).

The communication device 140 represents another DUC that needs to be provisioned, while the communication device 150 represents a device that has already been provisioned and connected to the home WiFi network.

Figure 2:
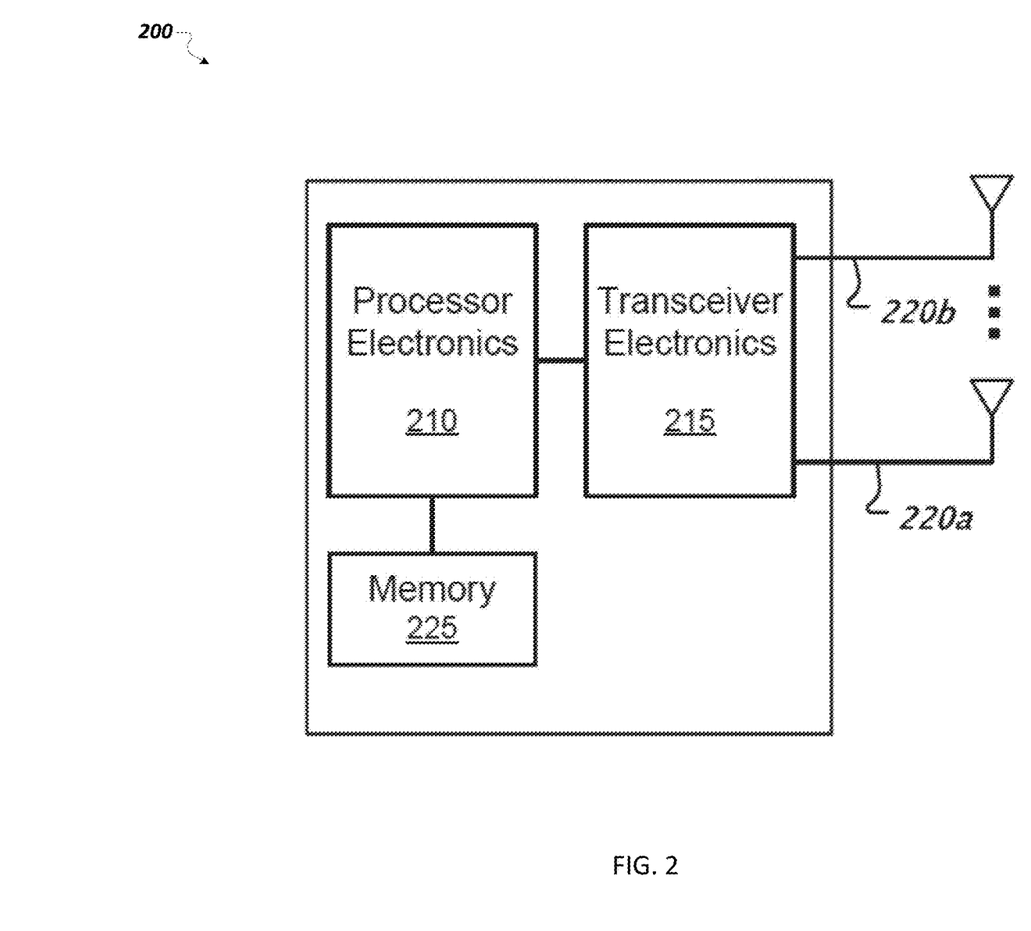
FIG. 2 shows a simplified block diagram of an example of a communication device.

FIG. 2 shows a simplified block diagram of an example communication device 200. Various examples of device 200 include an access point (AP), a client device, an IoT class of device, a microprocessor device, a base station (BS), an access terminal (AT), etc. For example, the device 200 can represent one or more of the communication devices 110, 120, 130, 140, and 150 in FIG. 1 or another device.

In some implementations, the communication device 200 can represent a microcontroller (e.g., the microcontroller 135) configured as a provisioning platform for provisioning one or more devices (e.g., the communication device 130). For example, the microcontroller can include transceiver electronics 215 so that the microcontroller itself is able to transmit and receive signals with an external device (e.g., a provisioning client device). In some implementations, the microcontroller may not include transceiver electronics in itself and instead use transceiver electronics of the device to which the microcontroller is attached for transmitting and receiving signals with an external device.

The device 200 can include processor electronics 210 such as one or more processors that implement methods effecting the techniques presented in this disclosure. The processor electronics 210 can be operable to execute computer-readable instructions that, when executed on the processor electronics 210, cause the device 200 to implement methods effecting the techniques presented in this disclosure. For example, the processor electronics 210 can cause the device 200 to perform client association and device provisioning.

The device 200 includes transceiver electronics 215 (e.g., a transmitter, receiver, or transceiver) to send and/or receive wireless signals over one or more antennas 220*a*-220*b*. In some implementations, transceiver electronics 215 can include multiple radio units. In some implementations, a radio unit includes a baseband unit (BBU) and a radio frequency unit (RFU) to transmit and receive signals. In some implementations, the device 200 includes dedicated circuitry for transmitting (e.g., a dedicated transmitter) and dedicated circuitry for receiving (e.g., a dedicated receiver). In some implementations, transceiver electronics 215 can transmit and receive signals that represent client association requests and responses, provisioning requests and responses, and network credential or other configuration information over one or more WLAN channels.

The device 200 can include one or more memories 225 configured to store information such as data and/or instructions (e.g., computer-readable instructions that cause the device 200 to implement methods effecting the techniques presented in this disclosure).

Figure 3:
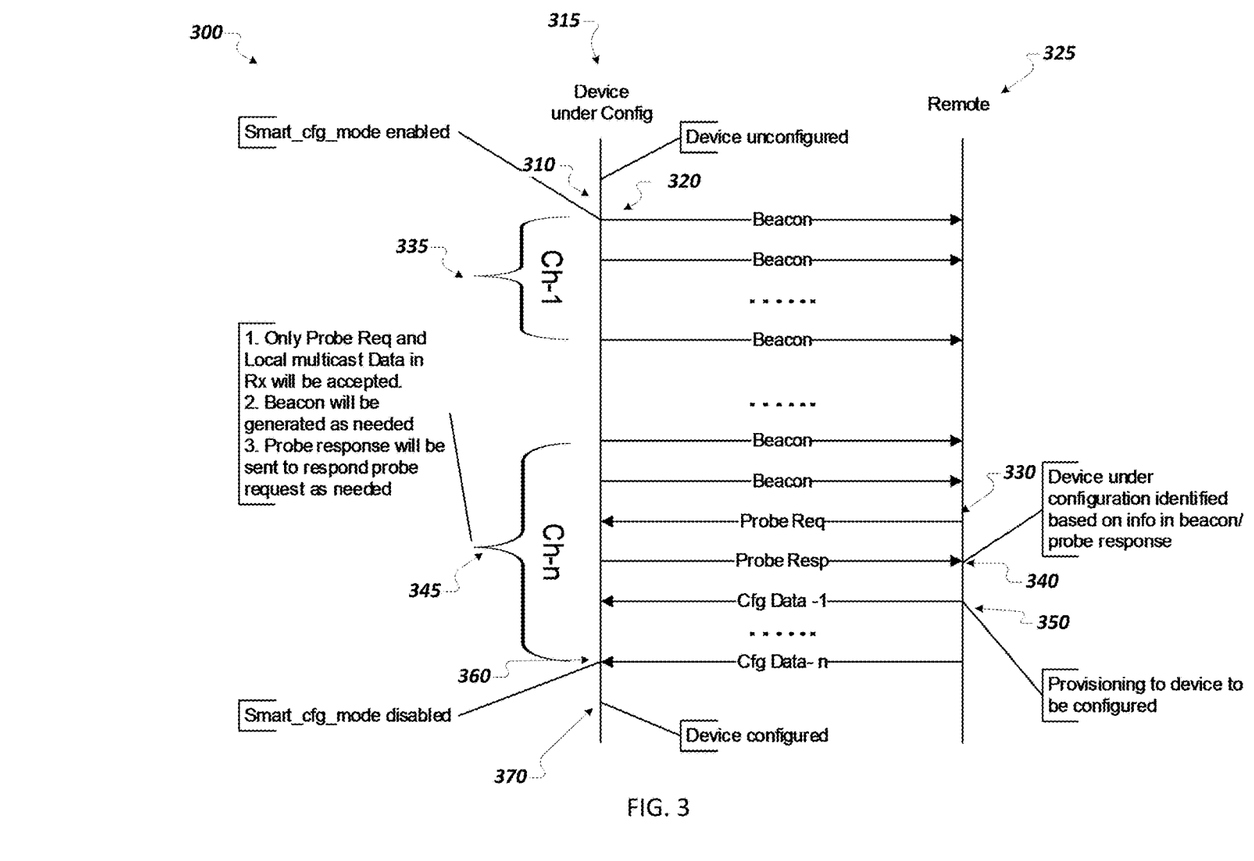
FIG. 3 is a swim lane diagram showing a process of provisioning a device in a communication system according to an example.

FIG. 3 is a swim lane diagram showing a process 300 of provisioning a device in a communication system according to a simultaneous AP-sniffer provisioning mode (also referred to as a smart configuration mode. This process 300 can be implemented by a device under configuration (DUC) 315 and a remote 325. The DUC 315 can be the communication device 130 or 140 and the remote 325 can be the client 120 in FIG. 1. The DUC 315 can include a microcontroller (e.g., the microcontroller 135) configured as a provisioning platform for provisioning the DUC 315. A provisioning application is running on the remote 325 that connects to an external AP (Ex-AP), e.g., the AP 110 FIG. 10*f* a communication network.

In some implementations, the DUC 315 is powered on. By checking its configured state, the DUC 315 can determine that it is un-configured and not connect to the communication network. As such, at 310, the DUC 315 enters or otherwise enables a smart configuration mode.

In some implementations, the remote 325 can initiate the provisioning application to discover that the DUC 315 needs to be provisioned. In some implementations, the provisioning application may raise a pop-up box for user notification. The end user can confirm that he/she wants to provision the DUC 315 by clicking a button on the pop-up box on the remote 325.

The DUC 315 can dwell (e.g., receive or sniff network traffic) on each channel (e.g., a WLAN channel) listed in a channel list for a predetermined minimum dwell time. On each channel, the DUC 315 can respond to probe requests (e.g., transmitted from the remote 325). It can also transmit periodic broadcast beacons. The beacons can include a Service Set Identifier (SSID) and/or an information element (IE).

When the DUC 315 and the remote 325 are on the same channel and the remote 325 supports passive scanning, the remote 325 can receive the beacons from the DUC 315. The DUC 315 is thus discovered by the remote 325. For example, FIG. 3 shows the DUC 315 dwells on channel Ch-1 335 and sends one or more beacons to the remote 325 at 320.

When the DUC 315 and the remote 325 are on the same channel and the remote 325 supports active scanning, the DUC 315 can respond to the probe requests from the remote 325. The DUC 315 is thus discovered by the remote 325. For example, FIG. 3 shows the remote 325 sending a probe request to the DUC 315 at 330 and obtaining a probe response from the DUC 315 at 340 in order to identify the DUC 315 properly. In some implementations, the DUC 315 may stay on a fixed channel (e.g., channel Ch-1 335) or switch on different channels (e.g., channel Ch-n 345) dynamically based on configurations.

In some implementations, once the provisioning application running on remote 325 has discovered the DUC 315, it can start provisioning the DUC 315. For example, the remote 325 can send a series of multicast frames (or broadcast packets or frames) at 350. In some implementations, because the DUC is not part of the home network yet, the DUC may not have the capability to read unicast frames that are encrypted. With multicast/broadcast frames, there are some parts of the frames that are transmitted in plain-text without encryption and hence the DUC can read them. As a result, information is encoded and exchanged with the DUC without the DUC being part of the network. The remote 325 can encode all meaningful information, such as network information including the SSID and passphrase of the home access point (e.g., 110 from FIG. 1) into header of the multicast frame for configuring the DUC 315 to connect itself to the Ex-AP. In some implementations, at 360, the provisioning application sends the network information using RESTful APIs.

The DUC 315 can decode the multicast packets and retrieve the necessary information to decide if information retrieved is relevant. If the DUC 315 finds the information retrieved is relevant, the DUC 315 can stop the smart configuration mode at 360 and the DUC 315 can be connected to the Ex-AP in an infra mode (also referred to as a station mode), where the DUC associates with the home access point and communicates with other devices via the access point.

If the information retrieved is not relevant, the DUC 315 would not stop the smart configuration mode. In such scenarios, the DUC 315 waits until the maximum dwell time expires and then switch to next channel to serve it for the minimum dwell time. The above process can be repeated until the DUC 315 is connected to the Ex-AP. Then the DUC 315 can be regarded as provisioned and configured at 370.

Figure 4:
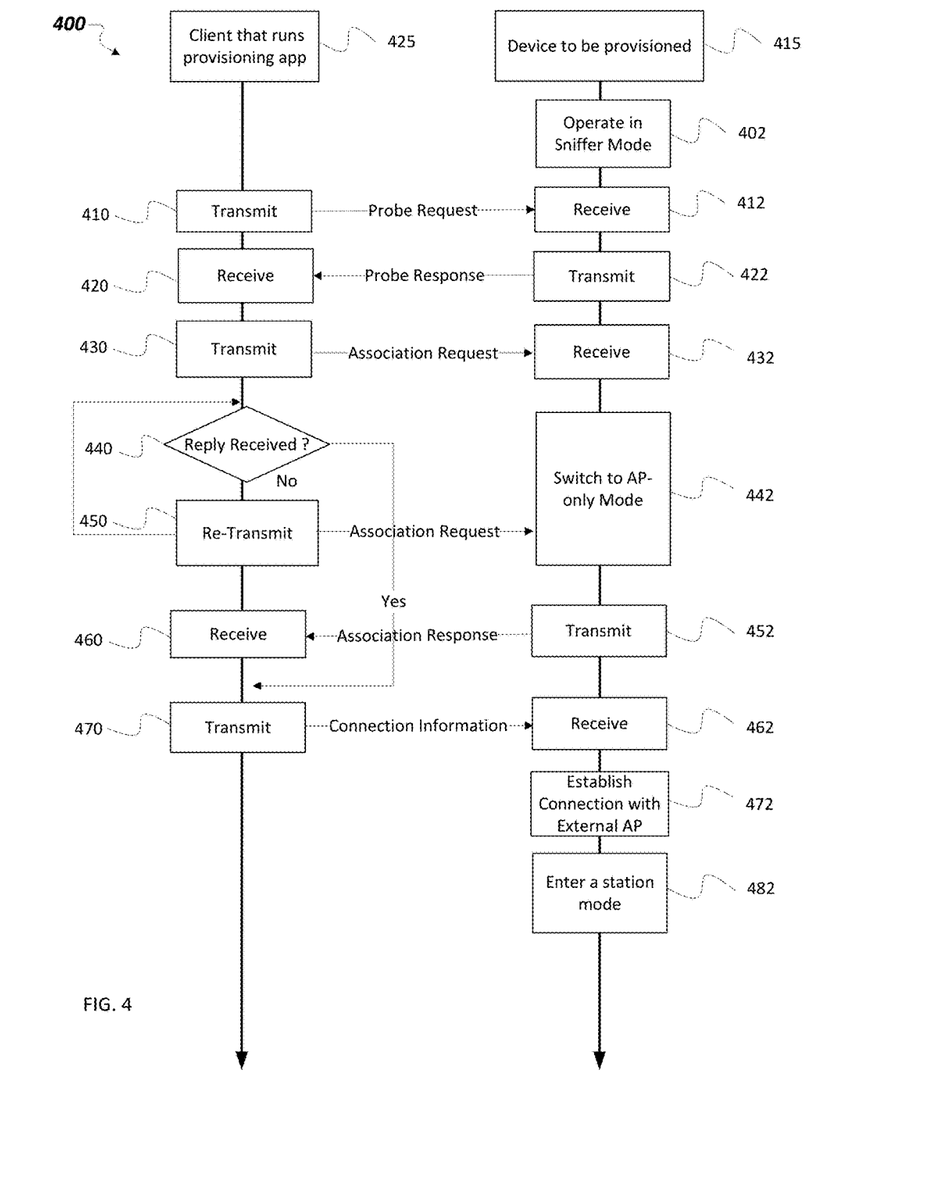
FIG. 4 is a swim lane diagram showing a process of client association for provisioning devices in a communication network according to an example.

FIG. 4 is a swim lane diagram showing process 400 of client association for provisioning devices in a communication network according to an example. This process 400 can be implemented by a device under configuration (DUC) 415 to be provisioned and a client 425 that runs a provisioning application. The DUC 415 can include an embedded microcontroller (e.g., the microcontroller 135 in FIG. 1) configured as a provisioning platform for provisioning one or more devices (e.g., the DUC 415). As an example, the DUC 415 can be the DUC 315 and the client 425 can be the remote 325 in FIG. 3, respectively.

At 402, the DUC 415 is operating in a sniffer provisioning mode. The sniffer provisioning mode can use multicast data to send the provisioning information in a certain format from the provisioning client to the DUC. The provisioning application running on a client device may choose to send the information about the network that the client device is connected to or some other networks. To send the network information to the DUC 415, the provisioning client device does not require to be disconnected from the associated home network. In some implementations, when a multicast IP packet is sent out on the Wi-Fi network with a multicast IP address as a destination, 23 LSB (Least Significant Bits) of the IP address gets copied into 23 LSBs of the destination MAC address.

The DUC 415 can dwell on a wireless communication channel (e.g., a WLAN channel). If DUC 415 receives multicast frames in an expected pattern, the sniffer mode provisioning is initiated. In the sniffer provisioning mode, the DUC 415 can sniff traffic on the wireless communication channel by listening to the radio channel and capturing traffic (e.g., packets being transmitted) on the channel. In some implementations, the sniffer provisioning mode can be a part of a simultaneous AP-sniffer-provisioning mode described with respect to FIG. 3.

At 410, the client 425 transmits a probe request on the channel. At 412, the DUC 415 receives the probe request on the channel. Upon receiving the probe request, at 422, the DUC 415 transmits a probe response to the client 425 on the same channel.

Upon receiving the probe response, at 420, the client 425 transmits an association request on the same channel to the DUC 415, at 430. At 432, the DUC 415 receives the association request. In some instances, when the DUC 415 detects the association request in the sniffer mode, the DUC 415 can determine that the association request is an indication of a client association for establishing a connection with the client 425. The association request can be an authentication request or a directed probe request. A directed probe request has an SSID field populated to check to whether the network with the SSID is in the range. The network with the SSID responds with a probe response, responsive to the directed probe request. The authentication request is to validate whether the requesting device has the capability to associate with the network.

In response to such a determination, at 442, the DUC 415 switches to the AP provisioning mode. In some implementations, the AP provisioning mode is an AP-only provisioning mode. In the AP-only provisioning mode, the client 425 can associate with the AP on the DUC 415 and use the connection to send the provisioning information as well as other configuration information if required. It is a reliable method of provisioning. In the AP provisioning mode, the DUC 415 is capable of accepting actual connections from the client 425. In some implementations, the AP provisioning mode is configured on the same channel on which the DUC 415 has received the association request.

In some implementations, the switch to the AP provisioning mode may take time. The client 425 may, at 440, determine whether a reply to the association request has been received. If a proper reply has not been received, the client 425 can, at 450, keep retransmitting the association request until a timeout has occurred. This timeout can be configured so that it is sufficiently large for the DUC 415 to switch to the AP-only provisioning mode. In some implementations, the timeout is set as 800 ms. The client 425 retransmits association requests for 800 ms. In some implementations, if it does not get a response in 800 ms, it can send probe requests indicating its ability to extend the timeout to wait until the DUC 415 completes mode switching.

Once the DUC 415 has switched to the AP-only provisioning mode, at 452, the DUC 415 transmits an association response to the client 425. At 460, the client 425 receives the association response. The client association goes through.

At 470, the client 425 transmits connection information on the same channel to the DUC 415. The connection information can be transmitted using RESTful APIs. The connection information including SSID and passphrase for establishing a connection with an external AP to which the client 425 has already been connected.

At 462, the DUC 415 receives and extracts the connection information. At 472, the DUC 415 establishes a connection with the external AP based on the connection information. Once the DUC 415 successfully establishes the connection with the external AP, the DUC 415 can be regarded as provisioned.

Upon the successful provisioning of the DUC 415, the DUC 415 will associate with the home network and enter in a station mode at 482. In some implementations, the DUC 415 will notify the provisioning application that the provisioning was successful.

In some implementations, if the provisioning of the DUC 415 is unsuccessful, in the AP provisioning mode, the DUC 415 can recognize the disassociation of the last client. When determining that the last client gets disassociated, the DUC 415 switches back to the simultaneous AP-sniffer provisioning mode to allow the sniffer provisioning mode to restart the provisioning mechanism.

In some implementations, a co-existence of WPS provisioning with sniffer provisioning mode provisioning can be implemented. As WPS provisioning requires a separate action on the device (e.g., pressing a button), this action can be used as a trigger to stop the sniffer provisioning mode and provision using the WPS process. In some implementations, the WPS timeout (e.g., 2 minutes) can be used to switch on the sniffer provisioning mode again.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
   receiving, from a provisioning device and by a device operating in a sniffer provisioning mode, an association request to associate with the provisioning device, the device sniffing traffic over a wireless communication channel by listening to the wireless communication channel and capturing traffic on the wireless communication channel in the sniffer provisioning mode;
   in response to receiving the association request, switching, by the device, to an access point (AP) provisioning mode;
   transmitting, by the device, an association response to the association request over the wireless communication channel;
   receiving, by the device and from the provisioning device over the wireless communication channel, connection information for establishing a connection with an external AP that is different from the provisioning device and the device; and
   establishing, by the device, a connection with the external AP based on the connection information.

2. The method of claim 1, wherein the association request is received over a wireless local area network (WLAN) channel, and the association response to the association request is transmitted over the WLAN channel.

3. The method of claim 1, wherein the association request comprises an authentication request or a directed probe request.

4. The method of claim 1, further comprising, prior to receiving the association request:
   receiving, by the device, a probe request; and
   transmitting, by the device, a probe response to the probe request.

5. The method of claim 4, wherein the probe request is received over a wireless local area network (WLAN) channel and the probe response is transmitted on the WLAN channel.

6. The method of claim 1, wherein the sniffer provisioning mode is a part of a simultaneous AP-sniffer provisioning mode.

7. The method of claim 1, further comprising, in response to establishing the connection with the external AP, switching, by the device, to a simultaneous AP-sniffer provisioning mode.

8. The method of claim 1, further comprising receiving retransmission of the association request during the switching to the AP provisioning mode.

9. A device comprising:
   processor electronics configured to:
      receive, from a provisioning device, an association request to associate with the provisioning device, the device operating in a sniffer provisioning mode, the device sniffing traffic over a wireless communication channel by listening to the wireless communication channel and capturing traffic on the wireless communication channel in the sniffer provisioning mode;
      in response to receiving the association request, switch to an access point (AP) provisioning mode;
      transmit an association response to the association request over the wireless communication channel;
      receive, from the provisioning device over the wireless communication channel, connection information for establishing a connection with an external AP that is different from the provisioning device and the device; and
      establish a connection with the external AP based on the connection information.

10. The device of claim 9, wherein the association request is received over a wireless local area network (WLAN) channel, and the association response to the association request is transmitted over the WLAN channel.

11. The device of claim 9, the processor electronics further configured to, prior to receiving the association request:
   receive a probe request; and
   transmit a probe response to the probe request.

12. The device of claim 11, wherein the probe request is received over a wireless local area network (WLAN) channel and the probe response is transmitted on the WLAN channel.

13. The device of claim 9, wherein the sniffer provisioning mode is a part of a simultaneous AP-sniffer provisioning mode.

14. A non-transitory computer-readable medium embodying a program operable to cause a device to perform operations comprising:
  receiving, from a provisioning device and by the device operating in a sniffer provisioning mode, an association request to associate with the provisioning device, the device sniffing traffic over a wireless communication channel by listening to the wireless communication channel and capturing traffic on the wireless communication channel in the sniffer provisioning mode;
  in response to receiving the association request, switching, by the device, to an access point (AP) provisioning mode;
  transmitting, by the device, an association response to the association request over the wireless communication channel;
  receiving, by the device and from the provisioning device over the wireless communication channel, connection information for establishing a connection with an external AP that is different from the provisioning device and the device; and
  establishing, by the device, a connection with the external AP based on the connection information.

15. The non-transitory computer-readable medium of claim 14, wherein the association request is received over a wireless local area network (WLAN) channel, and the association response to the association request is transmitted over the WLAN channel.

16. The non-transitory computer-readable medium of claim 14, the operations further comprising, prior to receiving the association request:
  receiving, by the device, a probe request; and
  transmitting, by the device, a probe response to the probe request.

17. The non-transitory computer-readable medium of claim 16, wherein the probe request is received over a wireless local area network (WLAN) channel and the probe response is transmitted on the WLAN channel.

18. The non-transitory computer-readable medium of claim 14, wherein the sniffer provisioning mode is a part of a simultaneous AP-sniffer provisioning mode.

19. The non-transitory computer-readable medium of claim 14, the operations further comprising, in response to establishing the connection with the external AP, switching, by the device, to a simultaneous AP-sniffer provisioning mode.

20. The non-transitory computer-readable medium of claim 14, the operations further comprising receiving retransmission of the association request during the switching to the AP provisioning mode.

* * * * *